Figure 1:
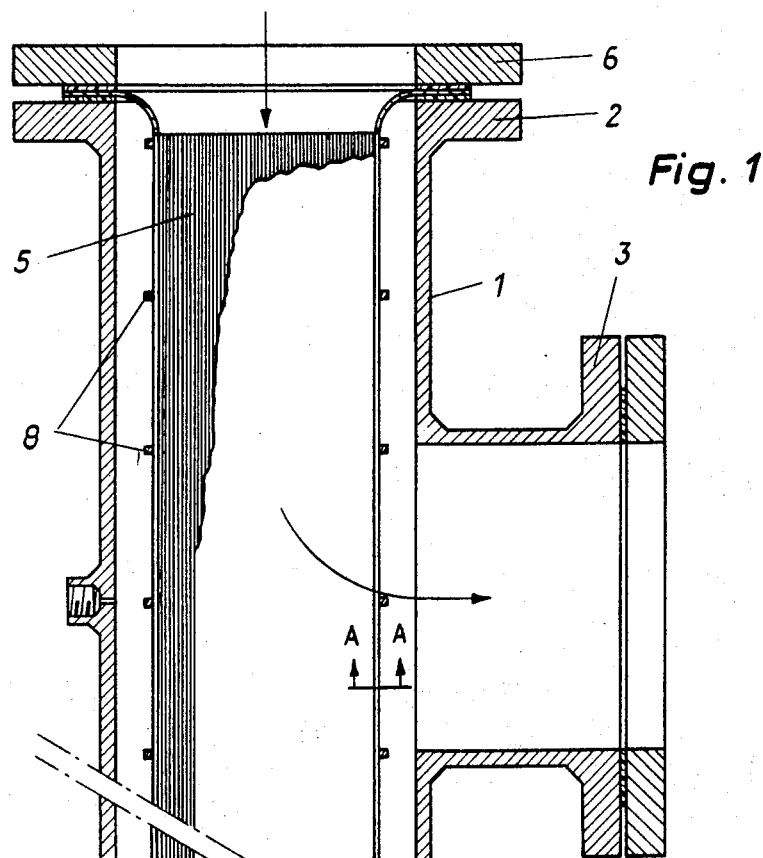

United States Patent [19]
Doucet

[11] 3,794,179
[45] Feb. 26, 1974

[54] FILTRATION OF FLUIDS

[76] Inventor: Charles Doucet, 20 Avenue Tronchet-Thonex, Geneva, Switzerland

[22] Filed: Aug. 31, 1971

[21] Appl. No.: 176,570

[30] Foreign Application Priority Data
Sept. 4, 1970 Switzerland.................... 13249/70
July 29, 1971 Switzerland.................... 11198/71

[52] U.S. Cl. .............................. 210/409, 210/433
[51] Int. Cl. ........................................... B01d 29/30
[58] Field of Search ....... 210/79, 81, 108, 433, 497, 210/23, 356, 498

[56] References Cited
UNITED STATES PATENTS
| | | | |
|---|---|---|---|
| 3,353,678 | 11/1967 | Dragon | 210/433 X;433 |
| 3,542,195 | 11/1970 | Soriente | 210/108 |
| 2,314,477 | 3/1943 | Bodey, Jr. | 210/497 X |
| 2,569,748 | 10/1951 | DeGrave | 210/108 |

Primary Examiner—Samih N. Zaharna
Assistant Examiner—T. A. Granger
Attorney, Agent, or Firm—Waters, Roditi, Schwartz & Nissen

[57] ABSTRACT

A filter tube having an inner cylindrical filter surface formed of longitudinal filaments with micro-grooves therebetween is supplied with fluid to be filtered through an inlet end towards a normally closed exhaust end. The fluid is normally diverted through a filtration zone in the filter surface, filtered matter being retained superficially on the filter surface whilst filtered fluid is extracted via an outlet. The filtration zone moves along the tube as the filter surface becomes clogged and an increase in the head loss when the entire filter suface is clogged actuates opening of the exhaust end to exhaust fluid with a flushing action which cleans the filter surface. Alternatively, the exhaust end can remain permanently open, a part of the fluid being diverted through the filter surface, and the non-diverted fluid cleaning the filter surface with a flushing action.

2 Claims, 2 Drawing Figures

PATENTED FEB 26 1974 3,794,179

FILTRATION OF FLUIDS

This invention relates to the filtration of fluids.

Certain known filters of the self cleaning type employ the principle of back wash which involves various mechanical operations or the manoeuvring of several valves, and additionally requires a feed back of filtered fluid for cleaning. In many cases, however, an inverse differential pressure much higher than the normal head loss of the filter may cause wear or damage to the filtering element. Moreover, use of these filters is often limited by the maximum dimensions of foreign bodies that they can receive without damage.

One aim of the invention is to provide an apparatus for filtering a fluid which does not involve the above drawbacks. The method according to the invention comprises supplying a fluid to be filtered along a direction substantially parallel to a longitudinal filter surface having a superficial filtering action; diverting at least a part of said fluid to be filtered to traverse and be filtered by said filter surface whilst filtered matter is superficially retained by said filter surface, and extracting the filtered fluid; and exhausting a fluid in said direction substantially parallel to said filter surface to remove filtered matter retained superficially on said filter surface with a flushing action.

Advantageously, the fluid to be filtered is supplied along said direction at a speed comprised between 0.5 and 6 metres per second, substantially all of said fluid being diverted to traverse said filter surface at relatively high speed through a filtration zone, said filtration zone being initially located at the downstream end of said filter surface and progressively moving upstream along said filter surface as said filter surface becomes clogged with filtered matter.

The fluid to be filtered can be supplied at a speed of approximately 3 metres per second to provide a filtration zone of substantially constant surface area and consequently a substantially constant head loss, said head loss increasing when all of said filter surface is clogged with filtered matter, and in which said exhaust of fluid with a flushing action is actuated upon increase of said head loss.

Alternatively, the exhaust of fluid with a flushing action is actuated at programmed intervals of time.

The exhaust of fluid with a flushing action can be effected by supplying a first fluid to be filtered followed by a second fluid, said second fluid being in a phase different to said first fluid, so as to form a liquid-gas emulsion of said first and second fluids, which emulsion is exhausted to remove filtered matter retained superficially on said filter surface.

According to another aspect of the method, a part of said fluid to be filtered is diverted to traverse said filter surface, and a non-diverted part of said fluid to be filtered is exhausted to remove filtered matter retained superficially on said filter surface.

Another aim of the invention is to provide a filter which avoids the mentioned drawbacks of known filters and which, in particular, can be constructed so as to be able to receive foreign bodies of any dimensions.

A device according to the invention for filtering a fluid comprises a longitudinal filtering member having a filter surface with superficial filtering action; inlet means for supplying a fluid to be filtered along a direction substantially parallel to said filter member; first outlet means for diverting at least a part of said fluid to be filtered to traverse and be filtered by said filter member whilst filtered matter is superficially retained by said filter member, and for extracting the filtered fluid; and second outlet means for exhausting a fluid in said direction substantially parallel to said filter surface to remove filtered matter retained superficially on said filter surface with a flushing action.

The filtering member is preferably cylindrical and comprises an inner cylindrical filter surface with superficial filtering action, said first outlet means surrounding said filter surface, and said filter surface being formed by filaments of triangular section disposed side by side longitudinally along said cylindrical member with a flat side of each filament facing inwardly and with outwardly flaring longitudinal gaps formed between adjacent filaments. The section and disposition of said filaments may be selected to obtain, for a given rate of flow of fluid to be filtered, a desired speed of passage of fluid to be filtered through said longitudinal gaps.

When said second outlet means comprises a valve for removably blocking a second outlet end of said cylindrical filtering member, the length of said filter surface may be selected, for a given rate of flow of fluid to be filtered, as a function of a desired period for filtering fluid between two successive openings of said valve to clean said filter surface.

Figure 2:
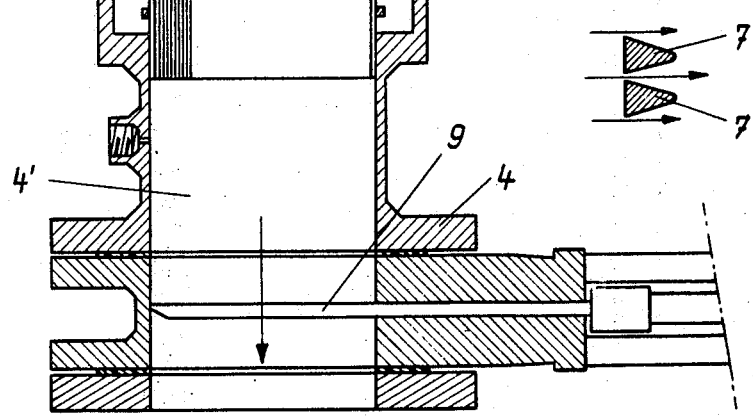

The invention will now be particularly described, by way of example, with reference to the accompanying drawings, in which:

FIG. 1 is an axial cross-section through a filter according to the invention; and FIG. 2 is a schematic enlarged scale cross-sectional view looking along line A—A of FIG. 1.

The filter shown comprises a body 1 having an inlet flange 2 for fluid to be filtered, a first outlet flange 3 for filtered fluid, a purge flange 4 defining a second outlet 4', and a longitudinal filter element 5 in the body 1.

A valve 9 on the purge flange 4 normally closes the outlet 4' and forces fluid entering via the inlet flange 2 to traverse the filter element 5 and pass out through the flange 3. Moreover, the valve 9 stops objects with relatively large dimensions and ensures cleaning of the filtering surface, as will be described below.

The filtering element 5 has the form of a cylindrical tube and is fixed to the inlet flange 2 by means of a ring 6. The tubular filtering element 5 is constituted of a plurality of filaments 7 extending longitudinally along the cylindrical tube, these filaments being arranged side by side in cylindrical configuration. The filaments 7 are each of generally triangular cross-sectional shape, as shown in FIG. 2, the bases of these triangles (left hand side of FIG. 2) forming an inner cylindrical filtering surface. The summits of the triangles opposed to said bases point radially outwards, downstream in relation to the direction of filtering flow schematically shown by the arrows in FIGS. 1 and 2. The longitudinal slots formed between adjacent filaments 7 can be micro-slots with a width of the order of only several microns, so that the inner filtering surface can be considered as being smooth, whilst the slots are wide enough to allow a laminar flow of liquid therethrough.

Support rings 8 for these filaments 7 are located at regular intervals along the tubular filtering element 5.

The tubular filtering element 5 has a superficial action, that is to say only the slots between the edges of said bases of the filaments 7 have a filtering action. Downstream of each slot, the space between adjacent filaments 7 flares out, as shown in FIG. 2, and consequently this part of the filaments does not have a retaining or filtering effect. The filtering action therefore only takes place on the inner cylindrical filtering surface and not throughout the thickness of the filaments.

Periodically, or in the case of need, the tubular filtering element 5 can be cleaned by opening the purge valve 9 to create a rapid longitudinal flow which removes filtered matter superficially retained on the filtering surface to clean the filtering surface with a flushing action. This manoeuvre can be manual or automatic.

With a vertically arranged filtering tube as described, it has been observed that by supplying a fluid to be filtered, for example water, through the upper inlet flange 2 at a speed of about 3 metres per second, a filtration zone forms at the lower, downstream end of the tube, in which filtration zone the water traverses the filtering tube, the remainder of the tube not being traversed by the water and therefore serving solely as guide means. This phenomenon is due to the kinetic energy of the water arriving at the closed lower end of the tube, which kinetic energy is partly converted into a radial pressure forcing the water to traverse the filtering surface.

The mentioned filtration zone has the shape of a relatively thin "virtual" ring at the lower end of the filtering tube. The height of this ring is between the limits of 1 to 4 cm, for example about 2 to 3 cm, and its surface area is constant and relatively small so that the speed of passage of the water therethrough is high. In these conditions, fine impurities which are not directly stopped at the threshold of the filtering surface completely traverse the wall of the tube, and due to the speed of flow cannot form a profound clogging, that is to say downstream of the inner filtering surface of the filtering tube.

When a mass or a film of impurities has superficially clogged the filtering slots in the surface of the filtration zone, the ring moves up along the tube towards the fluid inlet, whilst retaining the same characteristics, in particular its height which is a function only of the rate of flow of fluid. It should be noted here that, contrary to the operation of other types of filter, there is neither increase in the head loss, nor reduction of the flow during operation of the device since the filtration zone always has the same characteristics and simply moves along the tube.

This natural movement of the filtration zone ensures, due to the speed of filtering, effective cleaning throughout the thickness of the filtering wall, with for example elimination of particles auto-formed by surface tension, flocculation or vegetation, for the entire length of the filter and thus over its entire surface.

When the filtration zone or ring arrives at the inlet end of the tube all of the filtering surface is superficially clogged. At this moment, a known device, with a programmed remote control for example, is actuated by the increase in the head loss to open the purge valve and the flush of water through the filter element ensures complete removal of filtered matter retained superficially on the filtering surface. The efficiency of this flushing action is ensured by the construction of the filtering tube, namely the provision of filaments with narrow longitudinal slots along the same direction as the flow of flushing fluid. This avoids unwanted backwash in the vicinity of the micro-slots and even allows a penetration of flushing fluid beyond the filtering surface.

It would also be possible to deliver the fluid to be filtered vertically up through the filtering tube or, as a variant, along a horizontally disposed tube.

To improve cleaning of the filtering surface, it is possible to deliver air, a gas or a liquid, depending upon the fluid to be filtered, upstream of the filtering surface at the upper part of the filtering tube so as to obtain a liquid-gas emulsion, for example an emulsion of air and water, to carry out the flushing action. This supply of air (or otherwise) takes place at the periphery of the filtering tube and at the moment of actuating the flushing action; compressed air, pulsed air, or ambient air sucked in by the Giffard effect at the moment of opening the valve 9 can be used for this purpose. A non-return valve (not shown) could, in this case, be provided to ensure the automatic supply of air.

The described filter is an elementary filter with a single filtering tube. A multiple filter comprising several filtering tubes in a single body or in several bodies could also be provided.

Instead of the valve 9, another device could be used to removably close the second or flushing outlet.

As a variant, it is possible to provide a continuous flow of fluid to be filtered through a filtering tube, a part of this fluid being diverted through the filtering tube, whilst cleaning of filtered matter retained superficially on the filter surface is automatically carried out by the principal non-diverted stream of fluid which has flushing action.

The filter can also be cleaned at programmed intervals of time without waiting for it to become clogged, for example by means of a timer which actuates flushing for predetermined periods at regular intervals. The flushing period is very short, practically only several seconds, whilst the filtering time can be relatively long, since it is determined by the length of the filtering tube.

The principal characteristic of the described filtering device resides in the section of the filtering tube which is determined as a function of the instantaneous flow to obtain the required speed, whilst the length of the filtering tube is calculated as a function of the filtering time between successive cleaning operations. The length of the filtering tube is suitably comprised between 5 and 20 times the tube diameter. Good results have been obtained with a tube whose length is 10 times the diameter.

Finally, another advantage of the described filter device in which the filtering tube has substantially the same diameter as the conduit supplying fluid to be filtered is that any foreign body delivered via the conduit can pass through the filter without causing a blockage thereof or damage to the filtering tube. For example, if a fish is delivered into the filter, the fish will remain blocked in the filtering tube, without any risk, until the tube flushed and the fish is evacuated.

What is claimed is:

1. Device for filtering a fluid comprising a casing having an inlet at one end and a first outlet in the sidewall of said casing in fluid communication therewith, a longitudinal filtering tubular member with a filter surface having a superficial filtering action on a fluid to be filtered, said inlet being adjacent one end of said tubular member and supplying said fluid to be filtered interiorly of the tubular member along a direction substantially parallel to said filtering surface, said filter surface being formed by filaments of triangular cross-section disposed side by side longitudinally along said tubular member with a flat side of each filament facing inwardly and with outwardly flaring longitudinal gaps formed between adjacent filaments, said gaps extending substantially the length of said casing, the inwardly facing flat sides of said triangular filaments forming an inner filtering surface, the corners of the triangular cross-sections opposite to said inwardly facing flat sides pointing radially outwards towards the sidewall of the casing which contains the outlet and downstream in relation to the direction of filtering flow, a second cleaning outlet located opposite said inlet and adjacent the other end of said tubular member, said tubular member being spaced from the interior wall of said casing by an annular spacing substantially surrounding said tubular member, said first outlet being in fluid communication with said annular spacing, the filtered fluid which has traversed said filtering tubular member being extracted through said first outlet, the matter filtered from said fluid adhering substantially to said filtering surface during filtering of said fluid and means for controlling exhaust of fluid through said second cleaning outlet in said direction substantially parallel to said filter surface during filtration to remove matter retained superficially on said filtering surface with a flushing action with a portion of the fluid being filtered.

2. A device according to claim 1, in which said means for controlling the exhaust comprises a valve for removably blocking an outlet end of said filtering member.

* * * * *